United States Patent [19]

Fan

[11] 4,182,699

[45] Jan. 8, 1980

[54] AQUEOUS MICROEMULSIONS OF VINYL RESINS HAVING CARBOXYLIC OR SULFONIC GROUPS

[75] Inventor: You-Ling Fan, East Brunswick, N.J.

[73] Assignee: Union Carbide Corporation, New York, N.Y.

[21] Appl. No.: 865,126

[22] Filed: Dec. 28, 1977

Related U.S. Application Data

[63] Continuation-in-part of Ser. No. 846,541, Oct. 28, 1977, abandoned.

[51] Int. Cl.$^2$ ............................................. C08L 27/06
[52] U.S. Cl. ........................................... 260/29.6 PM
[58] Field of Search ............................... 260/29.6 PM

[56] References Cited

U.S. PATENT DOCUMENTS

| | | | |
|---|---|---|---|
| 3,146,122 | 8/1964 | Renner et al. | 260/29.2 |
| 3,357,938 | 12/1967 | Eisenwiener | 260/29.2 |
| 3,694,365 | 9/1972 | Custner | 252/106 |

*Primary Examiner*—Maurice J. Welsh
*Attorney, Agent, or Firm*—Bernard Francis Crowe

[57] ABSTRACT

Vinyl resins containing carboxyl or sulfonic acid functionalities can be formulated as stable aqueous microemulsions suitable for preparing coatings by converting them to ionomers in a mixture of solvents and water.

21 Claims, No Drawings

AQUEOUS MICROEMULSIONS OF VINYL RESINS HAVING CARBOXYLIC OR SULFONIC GROUPS

This is a continuation-in-part of Ser. No. 846,541 filed Oct. 28, 1977 now abandoned.

BACKGROUND OF THE INVENTION

This invention pertains to the preparation of stable aqueous microemulsions of carboxylic acid or sulfonic acid containing vinyl resins in a solvent/cosolvent mixture by converting said vinyl resins to ionomers.

Vinyl resin lacquers are old in the art and have enjoyed commercial success for coating various substrates with clear vinyl coatings. The coating operation however, involves the removal of large quantities of organic solvents in which the vinyl resins are dissolved. For ecological and anti-pollution considerations solvent based coatings are undesirable. This has led to consideration of water-borne resin system for coating applications. It has not been found feasible to simply substitute a water-borne system for the vinyl resin lacquers for several reasons. While one may make vinyl resin latexes by emulsion polymerization these polymerization techniques require the presence of components in the polymerization recipe which have a deleterious effect on the final coating. This is particularly true in can coatings where such criteria as blush resistance and water resistance, particularly at pasteurization temperatures is required. The presence of surfactants required to maintain stable emulsions increases the susceptibility of resin coatings on substrates to break down in contact with water.

It is therefore an object of this invention to afford a water-borne vinyl resin which is free of surfactants.

SUMMARY OF THE INVENTION

It has now been found that water-borne vinyl resin systems meeting the objects of this invention are provided by stable aqueous microemulsions of vinyl resins having an average particle size of about 0.02 to about 0.14 microns prepared by vigorously blending vinyl resins having carboxylic or sulfonic acid groups therein with a base, water, at least one organic, watermiscible solvent which has an affinity for said resins and a boiling point below about 160° C., and an organic, water-miscible co-solvent which is a poor solvent for said resins but is miscible with the organic solvents and has a boiling point above that of the organic solvents.

It is preferred to prepare these microemulsions by blending:

(A) a normally solid vinyl resin containing carboxylic or sulfonic acid groups and having the following moieties copolymerized herein

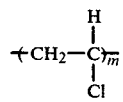

(1)

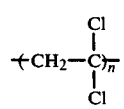

(2)

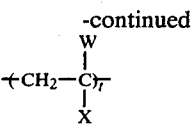

(3)

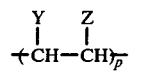

(4)

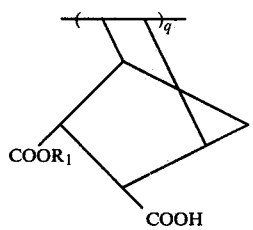

(5)

wherein m and n are percentages each having a value of 0–99%, t is a percentage having a value of 0–59%;

p is a percentage having a value of 1–30%;

when q = 0 q is a percentage having a value of 1–30%;

when p = 0 with the proviso that M+n+t is $\geq 70$ and $\leq 99\%$, that M+n+t+p+q = 100%, that when m = 0, N is at least 1 and that when n = 0, m is at least 1; wherein X is a monovalent radical selected from the groups consisting of -H and lower alkyls having 1–4 carbons;

W is a monovalent radical selected from the group consisting of —H, lower alkyls, aryl having 6 to about 9 carbons,

wherein a is an integer having values of 1–3,

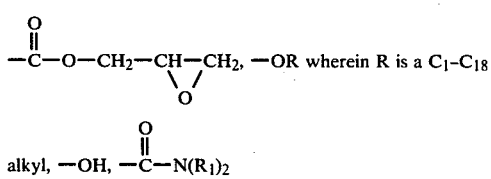

wherein R is a monovalent radical selected from the group consisting of —H, methyl or ethyl, and —CN;

Y is a monovalent radical selected from the group consisting of —H, methyl,

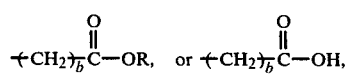

wherein b is an integer having values of 0–4, and

Z is a monovalent radical selected from the group consisting of

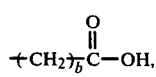

—SO₃H and —C₆H₄—SO₃H, with the proviso that Y and Z are never —COOH and —SO₃H at the same time, (B) sufficient water-miscible base to neutralize about 10% to 100% of said carboxylic or sulfonic acid groups, (C) 1 to about 200 parts, per 100 parts by weight of vinyl resin, of a water-miscible normally liquid solvent for said vinyl resin having a boiling point of up to 160° C., selected from the group consisting of lower aliphatic ketones, esters or ethers having 3 to about 6 carbon atoms and cycloaliphatic ketones or ethers having 4 to about 6 carbon atoms;

(D) 1 to about 200 parts, per 100 parts by weight of vinyl resin, of a normally liquid co-solvent which is miscible with water and solvent (C), having a boiling point greater than that of solvent (C), selected from the group consisting of:

(1) glycol monoalkyl ethers having the formula:

where each of R'', R''' is H or CH$_3$, r is an integer having values of 1 to 3 and R'''' is an alkyl group having 1 to about 6 carbon atoms, (2) aliphatic acidic ethers having the formula:

wherein R''''' is an alkyl group having 1 to 4 carbon atoms (3) amino esters having the formula:

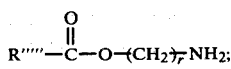

(4) amino ketones having the formula:

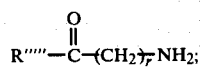

(5) aliphatic alcohols haaving the formula: R$_2$OH, where R$_2$ is alkyl having 1 to 5 carbons, (6) aliphatic carboxylic acids having the formula:

where R$_3$ is H or alkyl having 1 to 4 carbons, (7) aliphatic amines having the formula:

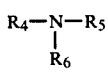

where R$_4$ and R$_5$ are H or alkyl having 1 to 6 carbons and R$_6$ is alkyl having 1 to 6 carbons with the proviso that the total number of carbons in the sum of R$_4$ +R$_5$ +R$_6$ ≦6, (8) aliphatic amino ethers having the formula:

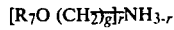

where R$_7$ is methyl or ethyl, and g has values of 1–4, (9) aliphatic dialkyl amides having the formula:

where R$_8$ is H or alkyl having 1 to 5 carbons,

(10) N-(Hydroxymethyl)acrylamide and N-(hydroxymethyl)methacrylamide having the formula:

where R$_9$ is H or —CH$_3$,

(11) cycloaliphatic ether alcohols having the formula:
(11) cycloaliphatic ether alcohols having the formula:

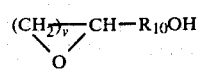

where R$_{10}$ is alkylene having 1 to 3 carbons and v is an integer having values of 1 to 5,

(12) hydroxy esters having the formula:

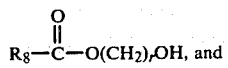

(13) hydroxy ketones having the formula:

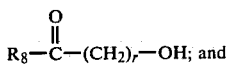

(E) sufficient water to provide an aqueous microemulsion having a total solids content of up to about 60% by weight.

The vinyl resins useful in this invention in their broadest sense are copolymers of vinyl chloride, vinylidene chloride or both copolymerized with a vinyl co-monomer containing at least one carboxylic acid group, —COOH or sulfonic acid group —SO$_3$H. Exemplary resins include copolymers of vinyl chloride acrylic or methacrylic acid, vinyl chloride and maleic acid, vinyl chloride and styrene sulfonic acid and the like; copolymers of vinylidene chloride and acrylic or methacrylic acid, vinylidene chloride and maleic acid, vinylidene chloride and styrene sulfonic acid, and the like.

These vinyl resins also encompass three component copolymers containing for example the following monomers copolymerized therein:
vinyl chloride/vinyl acetate/acrylic acid
vinyl chloride/vinyl acetate/maleic acid
vinyl chloride/vinyl acetate/crotonic acid
vinyl chloride/vinyl acetate/5-norbornene-2,3-di-carboxylic acid, monobutyl ester
vinyl chloride/vinyl acetate/fumaric acid
vinyl chloride/methyl methacrylate/maleic acid
vinyl chloride/acrylonitrile/maleic acid
vinyl chloride/styrene/maleic acid
vinyl chloride/vinyl stearate/maleic acid
vinyl chloride/2-propenyl acetate/maleic acid
vinyl chloride/hydroxypropylacrylate/maleic acid
vinyl chloride/glycidyl methacrylate/maleic acid
vinyl chloride/acrylamide/maleic acid
vinyl chloride/vinyl alcohol/maleic acid
vinyl chloride/vinyl butyl ether/maleic acid
vinyl chloride/ethyl acrylate/maleic acid
vinyl chloride/ethylene/maleic acid
vinyl chloride/ethylene/acrylic acid
vinyl chloride/propylene/maleic acid
vinyl chloride/styrene/acrylic acid
vinyl chloride/vinyl acetate/styrene sulfonic acid vinyl chloride/vinyl acetate/vinyl sulfonic acid, and the like as well as other terpolymers in which vinylidene chloride is substituted for vinyl chloride in this list.

In addition four component quadripolymers can also be used wherein both vinyl chloride and vinylidene chloride are copolymerized with the other comonomers shown in the terpolymers in the preceding paragraph.

The amount of each monomer copolymerized in the vinyl resins is not narrowly critical.

The ethylenically unsaturated carboxylic acids enumerated above as well as the other comonomers are commercially available. The more common sulfonic acid containing monomers are also commercially avaialable or can be synthesized by sulfonation of ethylenically unsaturated monomers ranging from aliphatic monomers, such as, ethylene to aromatic monomers, such as, styrene, with known sulfonation agents, such as, listed in "Unit Processes in Organic Synthesis" by P. H. Groggins, McGraw-Hill Co., Inc., page 262 NYC (1947).

The invention is not limited to single copolymers and so various combinations of two or more of these vinyl resins can be emulsified as well.

Preferred vinyl chloride resins include vinyl chloride terpolymers having about 60 to about 91 weight % vinyl chloride, about 10 about 25 weight % vinyl acetate and about 1 to about 15 weight % of maleic acid, fumaric acid or crotonic acid copolymerized therein. Such terpolymers may be obtained commercially or may be synthesized by a free radical initiated polymerization of vinyl chloride, vinyl acetate and maleic acid, or maleic anhydride, fumaric acid or crotonic acid.

The above-described vinyl chloride resins can also be blended with vinyl chloride/vinyl acetate terpolymers containing glycidyl or hydroxyalkyl acrylates or methacrylates having 2 or 3 carbons in the alkyl group to afford crosslinked coatings. One can also add thermosetting resins, such as, epoxy resins urea resins and melamine resins to obtain a higher degree of crosslinking. Preferred expoxy resins include liquid and solid diglycidyl ethers of bisphenol A which are commercially available and described in "Epoxy Resins" by H. Lee and K. Neville, McGraw-Hill and Co., Inc. NYC 1957, incorporated herein by reference.

Preferred melamine resins are the hexamethoxymethylmelamine resins. Preferred urea resins are the methylated urea-formaldehyde resins. These are commercially available.

Blush or whitening of the coatings is determined subjectively, a test well known to those skilled in the art.

Cross-hatch adhesive failure determinations are made scratching a cross on the coated substrates with a sharp pointed instrument, pressing sections of Scotch tape across the scratched portions and then ripping the Scotch tape away from the coated surface. Failures are indicated by the amount of coating which pulls away from the substrate.

It is a unique feature of the microemulsions described herein that very thin continuous protective films can be laid on both metallic and non-metallic substrates. The resultant films are pin-hole free, blush resistant and adhere tenaciously to the substrates. It is unexpected that these film properties are provided without the necessity of utilizing leveling aids or plasticizers.

While it is not necessary if viscosity adjustments of the microemulsions is desired minor amounts, i.e. up to 8% of the weight of vinyl resins, of thickening agents can also be included in the composition used to emulsify the vinyl resins. Suitable thickening agents include such water-soluble resins as, hydrolyzed polyvinyl acetates or polyvinyl alcohol, water-soluble cellulose derivatives, e.g., hydroxethyl cellulose, polyethylene glycols, acrylic or methacrylic acid polymers, poly ($\epsilon$-caprolactone), polyvinyl pyrrolidone, poly(methylvinyl ether), and the like.

Other additives known to those skilled in the art can also be incorporated into the microemulsions if desired. These include dyes, pigments, fillers, antioxidants, ultraviolet stabilizers, heat stabilizers, and the like.

For the purposes of this invention the term "water-miscible base" is used in the broad sense of any proton acceptor which will neutralize the acid functionalites in the vinyl resin, i.e., —COOH or $SO_3H$ groups and whose solubility is at least about 1 g. per 100 cc of water. Exemplary bases which may be organic or inorganic, include alkali metal or alkaline earth hydroxides, such as, sodium hydroxide, potassium hydroxide, lithium hydroxide, magnesium hydroxide, calcium hydroxide, strontium hydroxide, barium hydroxide, and the like; and ammonium hydroxide, organic amines including monoalkylamines, alkenediamines, alkanolamines, aromatic amines, cyclic amines, alkaryl amines, and the like. For economic reasons and ready availability alkali metal, alkaline earth and ammonium hydroxides are preferred inorganic bases. In coating application it is preferred to use volatile bases which are fugitive and consequently reversible ionomers are formed. For example, ammonium hydroxide or lower molecular weight alkylamines form ionomers which afford coatings wherein the ionomer moieties revert to acid and from which the base, being fugitive, is removed. This enhances blush resistance and minimize color formation upon exposure of the final coating to the elements. Particularly preferred alkylamines include monomethyl amine, dimethyl amine, trimethyl amine, triethyl amine, and the like.

In general, preferred alkyl amines have the formula:

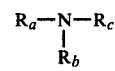

wherein each of $R_a$, $R_b$ and $R_c$ is H or a $C_1$–$C_6$ alkyl with the proviso that $R_a+R_b+R_c \leq 6$ carbons.

Preferred alkylene diamines have the formula:

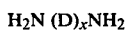

where $x=1-8$ and D is alkylene radical.

Preferred alkanolamines include mono-, di-, and triethanolamine, N-methylethanolamine, N,N-dimethylethanolamine, N,N-diethylethanolamine, N-aminoethylethanolamine, N-methyldiethanolamine, and the like.

Preferred cyclic amines include morpholine, N-methyl morpholine, piperidine, pyrrolidine, piperazine, N-methyl piperazine, N-(2-hydroxyethyl)piperazine, N-aminoethyl piperazine, 2,5-dimethyl piperazine, hexamethylene tetramine, and the like.

Preferred lower aliphatic ketone solvents include acetone, methyl ethyl ketone (MEK), diethyl ketone, methyl n-propyl ketone, methyl isopropyl ketone, acetyl acetone, 1-methoxy-2-propanone, and the like.

Peferred lower aliphatic ester solvents include methyl formate, ethyl formate, methyl acetate, ethyl acetate, isopropyl acetate, and the like.

Preferred lower aliphatic ether solvents include diethyl ether, ethyl propyl ether, di-n-propyl ether, and the like.

Preferred cycloaliphatic ketones solvents include cyclobutanone, cyclopentanone, cyclohexanone, and the like.

Preferred cycloaliphatic ether solvents include, dioxane, tetrahydrofurane, and the like.

Depending on the particular vinyl resin used it may be preferable to use mixtures of these solvents rather than a single solvent. For example, with a vinyl chloride/vinyl acetate/maleic acid terpolymer the combination of acetone with another ketone, such as, methyl ethyl ketone will give microemulsions superior to those formulated with acetone alone.

Exemplary co-solvents are presented below.

Representative glycol monoalkyl ethers are monomethyl, ethyl, propyl, butyl ethers of ethylene glycol, diethylene glycol, triethylene glycol, propylene glycol, dipropylene glycol, phenyl glycol ether, and the like.

Representative aliphatic acidic ethers include ethoxyacetic acid, α-methoxy-propionic acid, dimethoxy acetic acid, ethoxy propionic acid, and the like.

Representative amino esters include methyl β-aminopropionate, ethyl aminoacetate, ethyl aminopropionate, and the like.

Representative amino ketones include aminoacetone, 2-aminobutanone, and the like.

Representative aliphatic alcohols include, methanol, ethanol, propanols, butanols, pentanols, and the like.

Representative aliphatic carboxylic acids include formic, acetic, propionic, butyric, and like acids.

Representative aliphatic amines include methylamine, dimethylamine, methyl-ethylamine, dimethylamine, triethylamine, n-butylamine, hexamine, and the like.

Representative aliphatic amino ethers include γ-methoxy-n-propylamine, γ-ethoxy-n-propylamine, β-methoxy-isobutylamine, β-ethoxy-n-butylamine, and the like.

Representative aliphatic dialkyl amides include N,N-dimethylformamide, N,N-diethylformamide, N,N-dimetyl-acetamide, and the like.

Representative cycloaliphatic ether alcohols include glycidol, tetrahydrofurfuryl alcohol, and the like.

Representative hydroxy esters include methyl lactate, methyl-β-hydroxypropionate, ethyl-β-hydroxypropionate, and the like.

Representative hydroxy ketones include 1-hydroxy-2-propanone, 1-hydroxy-3-butanone, 3-methyl-4-hydroxy-2-butanone, 1-hydroxy-2-pentanone, 4-hydroxy-2-pentanone, and the like.

The order of addition of the components used to prepare these microemulsions is not critical. Thus for example one may first make a varnish of the vinyl resin with the solvent and co-solvent, followed by conversion to an ionomer with base and then emulsification with water. The water can be added to the varnish or vice versa. One may also make these microemulsions from dry vinyl resin rather than a varnish thereof, by adding pulverized resin pellets to a mixture of solvent, cosolvent, base and water.

The degree of neutralization of the acid moieties in the vinyl resin components can be pointed out above vary over a wide range, i.e., from about 10% to about 100%. The optimum degree of neutralization depends upon the amount of acid moiety in the vinyl resin. Thus for example a vinyl resin containing a low amount of acid moiety, e.g., 2 or 3 weight % should be neutralized with base to a much greater extent than a vinyl resin containing a large amount of acid moieties. This is believed to be due to the higher polarity of the higher acid moiety containing vinyl resins.

No special equipment is needed to effect emulsification other than agitation or mixing equipment known to those skilled in the art.

While not wishing to be bound by any theoretical explanation, it is believed that the formulation of the microemulsions of this invention is achieved without the necessity of employing surfactants by the use of a combination of:

(A) an organic solvent which
 (i) is water-miscible, i.e., at least 1% and preferably 10% water is soluble in said solvent on a weight basis;
 (ii) has an affinity for the vinyl resin used, i.e., the solvent/resin interaction is greater than the resin/resin interaction;
 (iii) has a boiling point below about 160° C.,
(B) an organic co-solvent which:
 (i) is as water-miscible as the solvent in (A);
 (ii) is a poor solvent for the vinyl resin used, i.e., the co-solvent/resin interaction is ≦ the resin/resin interaction;
 (iii) has a boiling point greater than the above-mentioned solvent; and
(C) a vinyl resin containing an ionomer functionality copolymerized therein.

The above-described combination of solvent and co-solvent surprisingly lowers the interfacial tension between the vinyl resin and the aqueous phase while avoiding coagulation. This affords the formation of a microemulsion where the micelles are stabilized by the ionomer repulsion of the ionomer moiety and the surfactant-like property of the co-solvent. When this stage is reached it is no longer necessary to have the solvent present and concentration of microemulsion can be effected to afford a higher solids content. In the application of these microemulsions to a substrate to form a coating the co-solvent also can be removed from the system with the water leaving only the vinyl resin to constitute the coating. In the case of vinyl resins neutralized with a volatile base, the ionomer in the vinyl resin reverts to the original free acid moiety.

The invention is further described in the Examples which follow. All parts and percentages are by weight unless otherwise specified.

EXAMPLE 1—PREPARATION OF SODIUM IONOMER MICROEMULSION

To a varnish composed of 56 g. of Bakelite VMCA vinyl resin (a terpolymer containing 81% vinyl chloride, 17% vinyl acetate and 2% maleic acid copolymerized therein), 65.3 g. of each of butyl Cellosolve (a trademark of Union Carbide Corporation for the monobutyl ether of ethylene glycol), and 65.3 g. of methyl ethyl ketone (MEK), was added with vigorous stirring 258 g. of an aqueous solution containing 0.7725 g. of sodium hydroxide. Mixing was carried out in a high-speed Waring Blender for 10 minutes. An aqueous emulsion of ionomer, that is, VMCA terpolymer neutralized with base to contain sodium maleate moieties rather than maleic acid moieties, was obtained which was uniform and translucent. The Brookfield viscosity of this emulsion was 21 centipoise. The pH was 7.8 at 25° C. The average size of the micelles measured by the scanning electron microscope technique, was found to be about 0.04–0.05 microns. This is within the range of microemulsion particles as defined in "Advances in Colloid and Interface Science", 4, pages 281–300 (1975), edited by K. Shinoda and S. Friberg.

EXAMPLE 2—PREPARATION OF AMMONIUM IONOMER MICROEMULSION

The procedure described in Example 1 was repeated with the exception that 2.33 g. of 58% aqueous ammonium hydroxide solution was substituted for the sodium hydroxide. A translucent, uniform microemulsion was obtained having a Brookfield viscosity of 24 centipoise.

EXAMPLE 2a—PREPARATION OF AMMONIUM IONOMER MICROEMULSION

The procedure described in Example 2 was repeated with the exception that the 65.3 g. of MEK was replaced by an equal amount of methyl acetate. A translucent, uniform microemulsion was obtained having a Brookfield viscosity of 25.6 cps of 26° C.

EXAMPLE 3—CONCENTRATION OF AMMONIUM IONOMER MICROEMULSION

The microemulsion prepared in Example 2 was stripped under vacuum at 45° C. using a Rinco rotary evaporator. A total of 219.8 g. of Condensate was collected containing water, butyl, Cellosolve and all of the MEK. The residual microemulsion remaining in the pot contained 28% of ionomer resin, 22% of butyl Cellosolve and 48% of water. The emulsion was uniform, very fluid and could be diluted with water or butyl Cellosolve without breaking the microemulsion.

EXAMPLE 4—PREPARATION OF TRIMETHYLAMINE IONOMER MICROEMULSION

The procedure used in Example 1 was repeated with the exception that, the vinyl resin was neutralized with 5.6 g. of a 25% trimethylamine solution in methanol. A uniform, translucent, ionomer microemulsion was obtained, which had a Brookfield viscosity of 17.6 centipoise at 25.5° C.

EXAMPLE 4a—PREPARATION OF TRIMETHYLAMINE IONOMER MICROEMULSION

The procedure described in Example 4 was repeated with the exception that the MEK was replaced with an equivalent amount of a 1/1 weight ratio mixture of MEK/acetone. A uniform, translucent ionomer microemulsion was obtained having a Brookfield viscosity of 18 centipoise at 26° C.

EXAMPLE 4b—PREPARATION OF TRIMETHYLAMINE IONOMER MICROEMULSION

Example 4 was repeated with the exception that the MEK was replaced by an equivalent amount of a 5/1 weight ratio mixture of MEK/methyl isobutyl ketone. A uniform, translucent, ionomer, microemulsion was obtained having a Brookfield viscosity of 20 centipoise at 26° C.

EXAMPLE 4c—PREPARATION OF TRIMETHYLAMINE IONOMER MICROEMULSION

EXAMPLE 4 was repeated with the exception that the MEK was replaced by an equivalent amount of a tetrahydrofuran. A uniform, translucent ionomer, microemulsion was obtained having a Brookfield viscosity of 20 centipoise at 26° C.

EXAMPLE 4d—PREPARATION OF TRIMETHYLAMINE IONOMER MICROEMULSION

Example 4 was repeated with the exception that the MEK was replaced with an equivalent amount of cyclohexanone. A milky, uniform, ionomer microemulsion was obtained.

EXAMPLE 4e—PREPARATION OF TRIMETHYLAMINE IONOMER MICROEMULSION

Example 4 was repeated with the exception that the MEK was replaced by an equivalent amount of diethyl ketone. A milky, uniform, ionomer microemulsion was obtained.

EXAMPLE 4f—PREPARATION OF TRIMETHYLAMINE IONOMER MICROEMULSION

Example 4 was repeated with the exception that the butyl Cellosolve was replaced by an equivalent amount of 1-butoxyethoxy-2-propanol. A uniform, translucent, ionomer microemulsion was obtained having a Brookfield viscosity of 18 centipoise at 25° C.

EXAMPLE 4g—PREPARATION OF TRIMETHYLAMINE IONOMER MICROEMULSION

Example 4 was repeated with the exception that the butyl Cellosolve was replaced by an equivalent amount of n-butanol. A uniform, translucent, ionomer microemulsion was obtained having a Brookfield viscosity of 16 centipoise at 25° C.

EXAMPLE 4h—PREPARATION OF TRIMETHYLAMINE IONOMER MICROEMULSION

Example 4 was repeated with the exception that the butyl Cellosolve was replaced by an equivalent amount of ethoxy triglycol. A uniform, milky, ionomer microemulsion was obtained having a Brookfield viscosity of 21 centipoise at 26° C.

EXAMPLE 4i—PREPARATION OF TRIMETHYLAMINE IONOMER MICROEMULSION

Example 4 4j—repeated with the exception that the butyl Cellosolve was replaced by an equivalent amount of butyl Carbitol (a tradename of Union Carbide Corporation for the monobutyl ether of diethylene glycol). A uniform, slightly translucent, ionomer, microemulsion was obtained having a Brookfield viscosity of 16 centipoise at 23.5° C. and a pH of 7.4.

EXAMPLE 4j—PREPARATION OF TRIMETHYLAMINE IONOMER MICROEMULSION

Example 4 was repeated with the exception that the butyl Cellosolve was replaced by an equivalent amount of Propasol Solvent A (a tradename of Union Carbide Corporation for 1-propoxy-ethoxy-2-ethanol). A uniform, slightly translucent, ionomer microemulsion was obtained having a Brookfield viscosity of 18 centipoise at 25° C. and a pH of 7.55.

EXAMPLE 4k—PREPARATION OF TRIMETHYAMINE IONOMER MICROEMULSION

Example 4 was repeated with the exception that the butyl Cellosolve was replaced with an equivalent amount of glycidol (2,3-epoxy-1-propanol). A uniform milky ionomer microemulsion was obtained having a Brookfield viscosity of 21 centipoise at 26° C.

EXAMPLE 5—PREPARATION OF SODIUM IONOMER MICROEMULSION

The procedure used in Example 1 was repeated with the exception that the co-solvent employed was butyl Carbitol (trademark of Union Carbide Corporation for the monobutyl ether of diethylene glycol) instead of butyl Cellosolve. A uniform, translucent ionomer microemulsion was obtained, which had a Brookfield viscosity of 16.8 centipoise at 23.5° C. and a pH of 7.4

EXAMPLE 6—PREPARATION OF SODIUM IONOMER MICROEMULSION

Example 1 was repeated with the exception that the co-solvent was Propanol Solvent P (tradename of Union Carbide Corporation for $C_4H_aOCH_2CH(CH_3)OH$), instead of butyl Cellosolve. A uniform, translucent microemulsion was obtained which had a Brookfield viscosity of 20 centipoise at ambient temperatures.

EXAMPLE 7—PREPARATION OF A 2-AMINO-2-METHYL-1,3-PROPANEDIOL IONOMER MICROEMULSION

The procedure described in Example 1 was repeated with the exception that 2.1 g. of 2-amino-2-methyl-1,3-propanediol was used in place of the sodium hydroxide. A uniform, translucent emulsion was obtained. The microemulsion had a Brookfield viscosity of 24 centipoise and a pH of 7.4 at ambient temperatures.

EXAMPLE 8—PREPARATION OF SODIUM IONOMER MICROEMULSION

The procedure described in Example 2 was used with the exception that Bakelite VMCC vinyl resin (a terpolymer containing 83% vinyl chloride, 16% vinyl acetate, and 1% maleic acid copolymerized therein) was used in place of the VMCA vinyl resin. A uniform, translucent microemulsion was obtained having a Brookfield viscosity of 20 centipoise at ambient temperatures.

The microemulsions described in Examples 1-8 can be deposited on various substrates and evaporated to provide continuous coatings thereon. In the case of Examples 1, 5, 6 and 8 the coatings are continuous films of sodium ionomer. In the case of Examples 2, 3, 4, 7 and 8, the coatings are continuous films of terpolymers containing free carboxyl groups rather than ionomers.

EXAMPLE 9—PREPARATION OF MIXED TRIMETHYLAMINE IONOMER MICROEMULSION

To a varnish composed of 37.33 g. of Bakelite VMCA vinyl resin 18.67 g. of Bakelite VERR vinyl resin (a terpolymer containing 80% vinyl chloride, 11% of vinyl acetate and 9% glycidyl methacrylate copolymerized therein having a number average molecular weight of about 8370), 65.3 g. of butyl Cellosolve and 65.3 g. of MEK was added slowly an aqueous solution containing 3.73 g. of trimethylene (as a 25% solution in methanol) and 258 g. of water. A uniform, milky microemulsion was obtained.

A 400 g. portion of this microemulsion was stripped under vacuum at 45° C. to an microemulsion weighing 190 g., corresponding to a resin solids content of 26.3%. The stripped microemulsion had a Brookfield viscosity of 22.4 centipoise at 25° C. and a pH of 6.85.

EXAMPLE 10—EVALUATION OF MICROEMULSION FROM EXAMPLE 9

The stripped microemulsion prepared in Example 9 was coated on various metallic substrates used in the industry for fabricating 2-piece cans. The microemulsion showed excellent wetting characteristics, good thermal stability during baking, good blush resistance, and smooth, glossy finishes. The type of substrate used, baking conditions and test results are shown in Table I with an epoxy resin control.

TABLE I

| SUBSTRATE | BAKE CYCLE | BLUSH | CROSS-HATCH ADHESIVE FAILURE, % |
|---|---|---|---|
| American Can Co. Budium[a] coated steel body can blanks | 4 min. at 365° F., 185° C. | Very Slight | 0 |
| Continental Can Co. Budium[a] coated tin-free steel body can blanks | 4 min. at 365° F., 185° C. | Very Slight | 0 |
| Alcoa 5182 cleaned only[c] | 4 min. at 350° F., 177° C. | Moderate | 0 |
| Alcoa 5182 converted[d] and cleaned[c] | 4 min. at 350° F., 177° C. | None | 0 |
| Electrically Coated Tin Plate[e] | 4 min. at 350° F., 177° C. | None | 0 |
| American Can Co. E-81 Epoxy[f] coated steel body can blanks | 4 min. at 320° F., 160° C. | None | 100 |

FOOTNOTES FOR TABLE I
[a]Budium is a Trademark of E.I. duPont de Nemours for a polybutadiene coating used on can liners.
[b]Alcoa 5182 is an aluminum-magnesium alloy sold by the Aluminum Co. of America.
[c]Cleaned with detergent to remove surface oil.
[d]Surface after cleaning converted to amorphous coating, such as, phosphate/chromate, or the like.
[e]Steel body blanks for cans coated with tin and abbreviated as ETP.
[f]E-81 epoxy is a urea-formaldehyde resin/bisphenol A solid epoxy resin formulation.

In contrast to the above results except for E-81 epoxy coated steel, emulsions of the same terpolymers containing ionic or non-ionic surfactants as emulsion stabilizers when coated onto the same substrates in the same manner showed severe blush and/or adhesion failure.

EXAMPLE 11—PREPARATION OF MIXED TRIMETHYLAMINE IONOMER MICROEMULSION

A stripped microemulsion of Bakelite VMCA and VERR was prepared as in Example 9 with the exception that the relative amounts vinyl resin used changed as shown in the following formulations:

| INITIAL MICROEMULSION | |
|---|---|
| VMCA | 33.6 g. |
| VERR | 22.4 g. |
| Butyl Cellosolve | 65.3 g. |
| MEK | 65.3 g. |
| Trimethylamine (25% solution in methanol) | 3.36 g. |
| Water | 258 g. |
| STRIPPED EMULSION | |
| VMCA/VERR (3/2) | 28.7% |
| Organic Components | 24.3% |
| Water | |

The stripped microemulsion was uniform and had a Brookfield viscosity of 33.6 centipoise at 24.5° C.

EXAMPLE 12—EVALUATION OF MICROEMULSION FROM EXAMPLE 11

The stripped vinyl resin microemulsion prepared in Example 11 was applied on typical substrates for fabricating 2-piece cans. The levels of performance of the resulting can coatings were compared with those obtained by the application of the same vinyl resins from organic solvents. The results are delineated in Tables II and III respectively.

TABLE II

| SUBSTRATE | BAKE CYCLE | BLUSH | CROSS-HATCH ADHESIVE FAILURE, % |
|---|---|---|---|
| American Can Co., Budium coated steel body blanks for can | 4 min. at 320° F., 160° C. | None | 0 |
| Continental Can Co. Budium coated tin-free steel body blanks for cans | 4 min. at 320° F., 160° C. | None | 0 |
| Alcoa 5182 cleaned only | 4 min. at 350° F., 170° C. | Moderate | 0 |
| Alcoa 5182 converted and cleaned | 4 min. at 350° F., 170° C. | None | 0 |
| Electrically coated tin plate (ETP) | 4 min. at 350° F., 170° C. | None | 0 |
| American Can Co. coated with E-81 Epoxy coated steel body can blanks | 4 min. at 320° F., 160° C. | None | 100 |

TABLE III[1]

| SUBSTRATE | BAKE CYCLE | BLUSH | CROSS-HATCH ADHESIVE FAILURE, % |
|---|---|---|---|
| American Can Co. Budium coated steel can blanks | 4 min. at 320° F., 160° C. | None | 0 |
| Continental Can Co. Budium coated steel can blanks | 4 min. at 320° F., 160° C. | None | 40 |
| Alcoa 5182 Cleaned Only | 4 min. at 350° F., 177° C. | Slight to Moderate | 0 |
| Alcoa 5182 Converted and Cleaned | 4 min. at 350° F., 177° F., 177° C. | None | 0 |
| Electrically Coated Tin Plate (ETP) | 4 min. at 350° F., 177° C. | None | 0 |

[1] The vinyl resins were applied from solutions in 1/1 butyl Cellosolve/MEK mixture.

EXAMPLE 13—PREPARATION OF AMMONIUM IONOMER MICROEMULSION

To an aqueous solution containing 65.3 g. of butyl Cellosolve, 65.3 g. of MEK, 2.33 g. of ammonium hydroxide (58%) and 258 g. of water was added 56 g. of solid Bakelite VMCA vinyl resin with agitation. The resin was converted immediately into a uniform translucent microemulsion. After standing for one day at room temperature, the microemulsion exhibited a Brookfield viscosity of 59.2 centipoise and a pH of 8.8.

EXAMPLE 14—PREPARATION OF TRIMETHYLAMINE IONOMER MICROEMULSION CONTAINING EPOXY RESIN

To a varnish composed of 2.8 g. of ERL-2774 (a liquid epoxy resin derived from bisphenol A and epichlorohydrin having an epoxy equivalent of 185-200, 56 g. of Bakelite VMCA vinyl resin, 52.2 g. of ethyl Cellosolve and 78.4 g. of MEK, there was added with vigorous stirring an aqueous solution containing 3.92 g. of trimethylamine (25% solution in methanol) and 258 g. of water. The mixing was carried out in a Waring Blender for 10 minutes. A milky, uniform microemulsion was obtained. This microemulsion when applied to various substrates and dried produced a protective coating. This demonstrates a variation of the invention where a thermosetting resin can be added to the microemulsion to provide a highly crosslinked coating.

EXAMPLE 15—PREPARATION OF TRIMETHYLAMINE IONOMER MICROEMULSION CONTAINING COAL TAR FILLER

To a mixture of 28 g. of Bakelite VMCC vinyl resin, 28 g. of Koppers Co. refined pitch K-374 (a coal tar), 65.3 g. of MEK, was added with vigorous stirring, and aqueous solution containing 258 g. of water and 5.6 g. of a 25% trimethylamine solution in methanol. A fine uniform microemulsion was obtained which when deposited on various substrates and dried provides a protective coating.

EXAMPLE 16—PREPARATION OF AMMONIUM IONOMER MICROEMULSION

To a varnish composed of 33.6 g. of vinyl resin VMCA, 22.4 g. of Bakelite VROH vinyl resin (a terpolymer containing 80% vinyl chloride, 5% vinyl acetate and 15% hydroxypropyl acrylate copolymerized therein), 65.3 g. of butyl Cellosolve and 65.3 g. of MEK was added with vigorous stirring an aqueous solution containing 258 g. of water and 1.4 g. of a 58% ammonium hydroxide solution. A uniform, milky microemulsion was obtained. After standing at room temperature for 48 hours, the microemulsion had a Brookfield viscosity of 17.6 centipoise and a pH of 8.45. This microemulsion when applied to various substrates and dried affords a protective coating.

EXAMPLE 17—PREPARATION OF AMMONIUM IONOMER MICROEMULSION

To a varnish composed of 56 g. of Bakelite VMCA vinyl resin, 52.5 g. of ethyl Cellosolve, and 78.4 g. of MEK, was added with vigorous stirring, an aqueous solution containing 2.33 g. of a 58% ammonium hydroxide solution and 258 g. of water. The microemulsion obtained had a solids content of 12.5%. It was stripped under vacuum at 45° C. until the solids content reached 27.5%. A white, uniform microemulsion was obtained having a Brookfield viscosity of 24 centipoise at 24° C. and a pH of 7. After standing at room temperature for one month there was no change in either viscosity or stability. This microemulsion when applied to various substrates and dried provided protective coatings.

EXAMPLE 18—PREPARATION OF AMMONIUM IONOMER MICROEMULSION CONTAINING MELAMINE

To a varnish composed of 37.33 g. of Bakelite VMCA vinyl resin, 10.67 g. of Bakelite VROH vinyl resin, 10 g. of Cymel 301 (a melamine resin sold by American Cyanamide Co.), 65.3 g. of butyl Cellosolve and 65.3 g. of MEK was added with vigorous stirring, an aqueous solution containing 258 g. of water and 1.56 g. of a 58% ammonium hydroxide solution. A white, milky microemulsion was obtained having a Brookfield viscosity of 17.6 centipoise and a pH of 8.35 at room temperature.

This microemulsion is also susceptible to concentration to a solids content of 29% and a Brookfield viscosity of 72 centipoise by stripping under vacuum at 45° C., with breaking the emulsion. A 400 g. portion of the original microemulsion was condensed to 178.5 g. of microemulsion which when coated on a set of 32 mil ground steel panels and baked in air oven at 365° F. (185° C.) for 4 minutes provided glossy coatings which showed good resistance to rubbing with acetone.

EXAMPLE 19—PREPARATION OF AMMONIUM IONOMER MICROEMULSION MIXED WITH HYDROLYZED POLYVINYL ACETATE AND HEXAMETHOXYMETHYLMELAMINE

An aqueous solution containing 6 parts by weight of Gelvatol 20/30 (85% hydrolyzed polyvinyl acetate sold by Monsanto Co.), 3 parts by weight of Cymel-301 (hexamethoxymethylmelamine sold by Cyanamid Co.), 3 parts by weight of ammonium hydroxide (58%) and 244 parts of water was mixed thoroughly with a varnish consisting of 60 parts by weight of Bakelite VMCC vinyl resin, 30 parts by weight of Bakelite VERR vinyl resin, 118 parts by weight of MEK and 20 parts by weight of butyl Cellosolve. A high-speed, high-shear blender was used. The resultant microemulsion having a solids content of 21% was concentrated under vacuum affording a microemulsion containing solids of 40%, 55% water, 4% butyl Cellosolve and about 1% ammonium hydroxide. This microemulsion was very uniform and milky, showed Tyndall scattering, had a Brookfield viscosity at 26.5° C. of 75 centipoise, had a flow time in a No. 4 Ford cup of 15 seconds at 26.5° C., and had a pH of 7.5. The average particle size, determined by electromicroscopy, was below 0.15 microns.

These microemulsions were stable on storage at room temperature for more than 6 months. They provide protective coatings when deposited on suitable substrates and baked.

EXAMPLE 20—PREPARATION OF AMMONIUM IONOMER MICROEMULSIONS MIXED WITH HYDROLYZED POLYVINYL ACETATE AND UREA-FORMALDEHYDE RESIN

Following the procedure described in Example 19 with the exception that an equivalent weight of Beetle 60 (normally liquid butylated urea-formaldehyde resin available from American Cyanamid Co.), was substituted for Cymel-301, a microemulsion was obtained containing total solids of 40%, 55% water, 4% butyl Cellosolve and about 1% ammonium hydroxide. This microemulsion was milky and uniform, had a pH of 7.2 and a Brookfield viscosity at 27° C. of 196 centipoise. This microemulsion provides a protective coating on substrates when deposited thereon and baked.

EXAMPLE 21—PREPARATION OF AMMONIUM IONOMER MICROEMULSION MIXED WITH HYDROLYZED POLYVINYL ACETATE AND HEXAMETHOXYMETHYLMELAMINE

Example 19 was repeated with the exception that 1.38 parts by weight of a 17/1 mixture of MEK/butyl Cellosolve was used. The resultant microemulsion contained 41% solids, 56% water, 2% butyl Cellosolve and about 1% ammonium hydroxide. The microemulsion had a Brookfield viscosity at 28° C. of 500 centipoise and a pH of 7.25. It provides protective coatings on substrates after baking.

EXAMPLE 22—PREPARATION OF AMMONIUM IONOMER MICROEMULSION MIXED WITH HYDROLYZED POLYVINYL ACETATE AND HEXAMETHOXYMETHYLMELAMINE

Example 19 was repeated with the exception that 138 parts by weight of a 9/1 mixture of MEK and butyl Cellosolve was used. The resultant microemulsion contained 40% solids, 56% water, 3% butyl Cellosolve and about 1% ammonium hydroxide. Its pH was 7.4 and Brookfield viscosity 78 centipoise at 29° C. It provides protective coatings on substrates after baking.

EXAMPLE 23—PREPARATION OF AMMONIUM IONOMER MICROEMULSION MIXED WITH HYDROLYZED POLYVINYL ACETATE AND UREA-FORMALDEHYDE RESIN

Example 19 was repeated with the exception that 138 parts by weight of an 18/1 weight ratio of MEK to butyl Cellosolve was used and an equivalent weight of Beetle-60 was substituted for the Cymel-301. The resultant emulsion contained 42% solids, 55% water, 2% butyl Cellosolve and about 1% ammonium hydroxide. The resultant microemulsion had a pH of 7.3 and a Brookfield viscosity of 188 at 29° C. It provides a protective coating for substrates when deposited thereas and baked.

EXAMPLE 24—PREPARATION OF AMMONIUM IONOMER MICROEMULSION MIXED WITH HYDROLYZED POLYVINYL ACETATE AND HEXAMETHOXYMETHYLMELAMINE

Example 19 was repeated substituting an equivalent weight of Bakelite VMCA vinyl resin for Bakelite VMCC vinyl resin, Elvanol 51-05G (86% hydrolyzed polyvinyl acetate available for DuPont), and using 138 parts of a 13/1 ratio of MEK/butyl Cellosolve. The resultant microemulsion contained 42% solids, 54% water, 3% butyl Cellosolve and about 1% ammonium hydroxide. Its pH was 7.1 and Brookfield viscosity 330 centipoise at room temperature. This microemulsion provides a protective coating for substrates when applied and baked.

EXAMPLE 25—PREPARATION OF AMMONIUM IONOMER MICROEMULSION MIXED WITH HYDROLYZED POLYVINYL ACETATE AND HEXAMETHOXYMETHYLMELAMINE

Example 19 was repeated with the exception that an equivalent weight of Bakelite VMCH vinyl resin (a terpolymer containing 86% vinyl chloride, 13% vinyl acetate and 1% maleic acid copolymerized therein) for Bakelite VMCC vinyl resin. The resultant microemulsion contained 40% solids, 55% water, 4% butyl Cellosolve and about 1% ammonium hydroxide. Its pH was 7.8 and Brookfield viscosity 87 centipoise at 26° C. This microemulsion provides a protective coating when applied to substrates and baked.

EXAMPLE 26—PREPARATION OF AMMONIUM IONOMER MICROEMULSION FROM SOLID VINYL RESIN

A mixture composed of 65.3 g. of each of butyl Cellosolve and MEK, 2.33 g. of ammonium hydroxide (58% in water) and 258 g. of water was thoroughly mixed in a Waring Blender. Then 56 g. of pulverized Bakelite VMCA vinyl resin was introduced into the mixture in the Waring Blender with vigorous agitation. Blending was continued for a total of 10 minutes during which time the temperature of the blend rose to 48° C. A translucent, uniform microemulsion was obtained having a Brookfield viscosity of 59 centipoise at 25° C. and containing 12.5% total solids.

EXAMPLE 27—PREPARATION OF TRIMETHYLAMINE IONOMER MICROEMULSION

To a varnish composed of 28 g. of Bakelite VMCA vinyl resin, 65.3 g. of MEK and 2.8 g. of aqueous trimethyl solution (25% in water) was added with vigorous stirring, 320.3 g. of an aqueous solution containing 127.6 g. of N-methylolacrylamide. A uniform, translucent, ionomer microemulsion was obtained. This microemulsion was concentrated under bacuum at 45° C. to a vinyl resin content of 18% by weight. The resultant highly uniform microemulsion had a pH of 7.1 and a Brookfield viscosity of 16.8 centipoise at 23.5° C.

EXAMPLE 28—PREPARATION OF 2-AMINOETHANOL IONOMER MICROEMULSION

The procedure described in Example 1 was repeated with the exception that the 0.7725 g. of sodium hydroxide was replaced by 0.75 g. of 2-aminoethanol and the Bakelite VMCA vinyl resin was replaced with an equivalent amount of a 3.2 weight ratio mixture of Bakelite VMCA vinyl resin/Bakelite VERR vinyl resin. A uniform, milky, ionomer microemulsion was obtained having a Brookfield viscosity of 19 centipoise at 25° C.

EXAMPLE 29—PREPARATION OF N,N-DIMETHYLETHANOLAMINE IONOMER MICROEMULSION

To a varnish composed of 33.6 g. of Bakelite VMCA vinyl resin, 22.4 g. of Bakelite VERR vinyl resin, 97.95 g. of MEK, 24.50 g. of butyl Cellosolve and 8.17 g. of ethyl Cellosolve was added with vigorous stirring, 259.3 g. of an aqueous solution containing 1.25 g. of N,N-dimethylethanolamine. A uniform, milky, ionomer microemulsion was obtained. This was concentrated under vacuum at 45° C. yielding a uniform, microemulsion containing 30% total solids having a Brookfield viscosity of 28 centipoise at 25° C.

EXAMPLE 30—PREPARATION OF TRIETHYLAMINE IONOMER MICROEMULSION

To a varnish composed of 78.36 g. of Bakelite VMCA vinyl resin 52.24 g. of Bakelite VERR vinyl resin, 32.85 g. of butyl Cellosolve and 97.75 g. of MEK, was added with vigorous stirring 261.7 g. of an aqueous solution containing 3.7 g. of triethylamine. A uniform, milky, ionomer microemulsion was obtained which was concentrated under vacuum to yield a microemulsion containing 43.7% total solids and having a Brookfield viscosity of 71.2 centipoise at 23° C.

EXAMPLE 31—PREPARATION OF N-METHYL MORPHOLINE IONOMER MICROEMULSION

To a varnish composed of 44.79 g. of Bakelite VMCA vinyl resin, 29.86 g. of Bakelite VERR vinyl resin, 97.95 g. of MEK, 24.5 g. of butyl Cellosolve, and 8.17 g. of methyl Cellosolve, was added with vigorous stirring, 259.99 g. of an aqueous solution containing 1.9 g. of N-methyl morpholine. A uniform, milky ionomer microemulsion was obtained which was concentrated under vacuum to yield a microemulsion containing 35.7% total solids and having a Brookfield viscosity of 156 centipoise at 23° C.

EXAMPLE 32—PREPARATION OF TRIMETHYLAMINE IONOMER MICROEMULSION CONTAINING HYDROXYL-MODIFIED EPOXY RESIN

To a varnish composed of 87.07 g. of Bakelite VMCA vinyl resin, 32.65 g. of ethyl Cellosolve and 97.95 g. of MEK was added with vigorous stirring an aqueous solution containing 8.7 g. of trimethylamine (25% solution in water), 24 g. of LSU-494 (a water dilutable hydroxyl-modified epoxy resin having an epoxy value of 0.013 and an hydroxyl value of 0.30 equivalents/g. sold by Ciba-Geigy Co.), 5 g. of Cymel-301 and 258 g. of water. A uniform, slightly translucent ionomer-microemulsion was obtained. This microemulsion was concentrated under vacuum at 46° C. to yield a microemulsion of the following composition:
  Vinyl resin—36%
  LSU-494—9%
  Cymel-301—2%
  Solvents—8%
  Water—45%

The concentrated microemulsion was highly uniform with a Brookfield viscosity of 88 centipoise at 25° C. and a pH of 6.85. After a storage period of 5 months the microemulsion was still stable. It was applied to three metallic substrates normally used for fabricating 2-piece cans, viz., Aluminum A-376 (Alcoa 5182 cleaned only), Aluminum A-272 (Alcoa 5182 conversion coated and cleaned) and ETP. Application conditions used to form coatings on these substrates are presented in Table IV together with blush and adhesion test results of the resultant coatings.

TABLE IV

| SUBSTRATE | BAKE CYCLE | BLUSH | CROSS-HATCH ADHESIVE FAILURE, % |
|---|---|---|---|
| Aluminum A-376 | min. at 177° C. | None | 0% |
| | 2 min. at 196° C. | None | 0% |
| Aluminum A-272 | 4 min. at 177° C. | None | 0% |
| | 2 min. at 196° C. | None | 0% |
| ETP | 4 min. at 177° C. | None | 0% |
| | 2 min. at 196° C. | Slight | 0% |

EXAMPLE 33—PREPARATION OF TRIMETHYLAMINE IONOMER MICROEMULSION CONTAINING HYDROXYL-MODIFIED EPOXY RESIN

Example 33 was repeated with the exception that the 5 g. of Cymel-301 was replaced with 5 g. of Cymel-303 (a hexamethoxymethylmelamine produced by American Cyanamid Co.). A uniform slightly translucent ionomer microemulsion was obtained. This was stripped under vacuum at 46° C. to yield a microemulsion having a total solids content of 47.2% and a Brookfield viscosisty of 90.4 centipoise at 26° C.

EXAMPLE 34—PREPARATION OF TRIMETHYLAMINE IONOMER MICROEMULSION CONTAINING HYDROXYL-MODIFIED EPOXY RESIN

Example 33 was repeated with the exception that the 5 g. of Cymel-301 was replaced by 5 g. of Cymel-350 (a melamine resin sold by American Cyanamid Co.). A uniform, slightly translucent ionomer microemulsion was obtained. This was concentrated under vacuum at 45° C. to yield a microemulsion having a total solids content of 41.5%, a Brookfield viscosity of 39.2 centipoise at 26.5° C. and a pH of 7.05.

EXAMPLE 35—PREPARATION OF AMMONIUM IONOMER MICROEMULSIOSN CONTAINING HYDROXYL-MODIFIED EPOXY RESIN

To a varnish composed of 87.07 g. of Bakelite VMCC vinyl resin (a terpolymer containing 83% vinyl chloride, 16% vinyl acetate and 1% maleic acid copolymerized therein having a number average molecular weight of 14,800), 36.65 g. of ethyl Cellosolve and 97.95 g. of MEK, was added with vigorous stirring an aqueous solution containing 3.63 g. of ammonium hydroxide (58%), 19 g. of LSU-494 epoxy resin, 3.5 g. of Beetle-60 urea resin, and 258 g. of water. A uniform, milky ionomer microemulsion was obtained. This was stripped under vacuum at 47° C. to yield a microemulsion having a total solids content of 45% and a Brookfield viscosity of 36 centipoise at 26° C.

EXAMPLE 36—PREPARATION OF AMMONIUM IONOMER MICROEMULSION MIXED WITH HYDROLYZED POLYVINYL ACETATE

Example 19 was repeated with the exception that the mixed vinyl resins were replaced with 90 g. of Bakelite VMCC vinyl resin and the Cymel-301 resin was eliminated from the formulation. A uniform, milky, ionomer microemulsion was obtained. This was concentrated under vacuum to yield a microemulsion having a total solids content of 40% and Brookfield viscosity of 170 centipoise at 24° C.

A portion of the stripped emulsion was mixed thoroughly with 31 parts of 1-butoxyethoxy-2-propanol per hundred parts of vinyl resin. The resultant microemulsion was uniform and exhibited a Brookfield viscosity of 252 centipoise and a No. 4 Ford cup, viscosity of 27 seconds at 24° C. This microemulsion was used to coat substrates with a draw down rod. The substrates were window glass plates, 25 mil aluminum Q-panels sold by the Q-panel Co. and 10 mil cold rolled steel panels smooth finish. After drying overnight at room temperature, clear, coherent coatings were obtained on all of these substrates.

EXAMPLE 37—PREPARATION OF AMMONIUM IONOMER MICROEMULSION MIXED WITH HYDROLYZED POLYVINYL ACETATE

Example 36 was repeated with the exception that the Gelvatol-20/30 was replaced with Gelvatol-20/90. A uniform, milky, ionomer microemulsion was obtained. This was stripped under vacuum at 45° C. to yield a microemulsion having a total solids content of 29% and a Brookfield viscosity of 86 centipoise at 26° C.

EXAMPLE 38—PREPARATION OF AMMONIUM IONOMER MICROEMULSION MIXED WITH HYDROLYZED POLYVINYL ACETATE

Example 19 was repeated with the exception that the Bakelite VMCC vinyl resin was replaced by an equal amount of Bakelite VMCA vinyl resin and the Cymel-301 was replaced by an equal amount of Beetle-60. A uniform, milky ionomer microemulsion was obtained. Upon vacuum stripping at 47° C., a microemulsion having a total solids content of 41% and Brookfield viscosity of 3064 centipoise at 23° C. was obtained.

This microemulsion can be diluted with water without breaking down. This was demonstrated by the data shown below:

| GRAMS OF WATER ADDED TO 135 g. OF MICRO-EMULSION | TOTAL SOLIDS % BY WEIGHT | VISCOSITY VISCOSITY CENTIPOISE | OBSERVATION OF MICRO-EMULSION |
|---|---|---|---|
| — | 41 | 3064 | uniform |
| 23.1 | 35 | 704 | " |
| 49.5 | 30 | 232 | " |

-continued

| GRAMS OF WATER ADDED TO 135 g. OF MICRO- EMULSION | TOTAL SOLIDS % BY WEIGHT | VISCOSITY VISCOSITY CENTIPOISE | OBSER- VATION OF MICRO- EMULSION |
|---|---|---|---|
| 86.4 | 25 | 72 | " |

EXAMPLE 39—PREPARATION OF AMMONIUM IONOMER MICROEMULSION

To an aqueous solution containing 244 g. of water, 6 g. of Gelvatol-20/90, 3 g. of Beetle-60 and 3 g. of ammonium hydroxide (58%) was added with vigorous stirring, a varnish composed of 60 g. Bakelite VMCC vinyl resin, 30 g. of Bakelite VERR vinyl resin, 117.5 g. of MEK and 19.5 g. of butyl Cellosolve. A uniform, milky, ionomer microemulsion was obtained. This was concentrated under vacuum to yield a microemulsion having a total solids content of 40% and a Brookfield viscosity of 908 centipoise at 24° C.

EXAMPLE 40—EVALUATION OF AMMONIUM IONOMER MICROEMULSION MIXED WITH HYDROLYZED POLYVINYL ACETATE

The concentrated microemulsion prepared in Example 19 was applied on typical substrates for fabricating 2-piece cans. The performance data of the resultant can coatings in blush resistance and wet adhesion are shown in Table V.

TABLE V

| SUBSTRATE | BAKE CYCLE | BLUSH | CROSS- HATCH ADHESION FAILURE % |
|---|---|---|---|
| Continental Can Co. Budium coated tin-free steel can blank | 4 min. at 173° C. 4 min. at 185° C. | None None | 0% 0% |
| American Can Co. Budium coated steel can blanks | 4 min. at 173° C. 4 min. at 185° C. | None None | 0% 0% |
| Aluminum A-272 | 4 min. at 177° C. 2 min. at 195° C. | None None | 0% 0% |
| Aluminum A-376 | 4 min. at 177° C. 2 min. at 195° C. | None None | 0% 0% |
| ETP | 4 min. at 177° C. 2 min. at 195° C. | None None | 0% 0% |

EXAMPLE 41—PREPARATION OF AMMONIUM IONOMER MICROEMULSION CONTANING CARBOWAX-1000

To a varnish composed of 87.87 g. of Bakelite VMCA vinyl resin, 32.65 g. of ethyl Cellosolve, and 97.95 g. of MEK, was added with vigorous stirring an aqueous solution containing 258 g. of water, 3.62 g. of ammonium hydroxide (58%), 24 g. of Carbowax polyethylene glycol-1000 (a tradename for Union Carbide Corporation polyethylene glycol having a formula molecular weight range of 950–1050), and 5 g. of Beetle-60. A uniform, milky ionomer microemulsion was obtained. This was stripped under vacuum to yield a microemulsion having a total solids content of 45.6% and, a Brookfield viscosity of 112 centipoise at 25° C.

EXAMPLE 42—PREPARATION OF TRIMETHYLAMINE IONOMER MICROEMULSION CONTAINING CARBOWAX-1000 AND CYMEL-301

To a varnish composed of 87.07 g. of Bakelite VMCA vinyl resin, 32.65 g. of ethyl Cellosolve and 97.95 g. of MEK was added with vigorous stirring an aqueous solution containing 258 g. of water and 8.7 g. of trimethylamine. A uniform, milky ionomer microemulsion was obtained. This was concentrated under vacuum to yield a microemulsion having a Brookfield viscosity of 176 centipoise at 25.5° C.

One hundred grams of the above-described microemulsion was mixed with 10 g. of Carbowax polyethylene glycol-6000 and 2 g. of Cymel-301 yielding a microemulsion having a Brookfield viscosity of 832 centipoise at 25.5° C. This microemulsion was deposited on an aluminum A-272 panel and baked at 177° C. for 4 minutes. A clear, coherent coating was produced on the panel.

EXAMPLE 43—PREPARATION OF TRIMETHYLAMINE IONOMER MICROEMULSION CONTAINING CELLOSIZE AND CYMEL-301

The blending procedure described in Example 43 was repeated with the exception that the aqueous solution was replaced by one containing 239 of water, 20 g. of 5% solution of Cellosize-QP-40 in water (Cellosize is a tradename of Union Carbide Corporation, for hydroxyethylcellulose) 2 g. of Cymel-301, and 8.7 g. of a solution of trimethylamine (25% in water). A uniform, milky ionomer microemulsion was obtained. This was stripped under vacuum to yield a microemulsion having a total solids content of 36.7% and a Brookfield viscosity of 656 centipoise.

EXAMPLE 44—PREPARATION OF TRIMETHYLAMINE IONOMER MICROEMULSION CONTAINING CELLOSIZE AND CYMEL-301

Example 43 was repeated with the exception that the Cellosize QP-40 was replaced with an equal amount of QP-300. The stripped microemulsion was uniform and had a total solids content of 37% and a Brookfield viscosity of 352 centipoise at 25° C.

EXAMPLE 45—PREPARATION OF AMMONIUM IONOMER MICROEMULSION CONTAINING CELLOSIZE AND CYMEL-301

To a varnish composed of 60 g. of Bakelite VMCC vinyl resin, 30 g. of Bakelite VERR vinyl resin, 85.25 g. of MEK and 45.35 g. of butyl Cellosolve, was added with vigorous stirring an aqueous solution containing 249 g. of water, 10 g. of a 5% Cellosize QP-15,000 solution in water, 2 g. of Cymel-301, and 2.5 g. of aqueous ammonium hydroxide (58%). A uniform, milky ionomer, microemulsion was obtained. This was stripped under vacuum to yield a microemulsion having a total solids content of 38% and a Brookfield viscosity of 294 centipoise at 27° C.

EXAMPLE 46—ELECTRODEPOSITION OF TRIMETHYLAMINE IONOMER MICROEMULSION

Example 4 was repeated with the exception that only one-half of the amounts of Bakelite VMCA vinyl resin and trimethylamine was employed to make the varnish and aqueous solution respectively. A uniform, translucent ionomer microemulsion was obtained. This was concentrated under vacuum until the total solids content reached 8.5%. The pH of the microemulsion was adjusted to 7.5 by the addition of more trimethylamine. The microemulsion was then placed in a pyrex glass electrodeposition cell. Pairs of 0.064 inch diameter copper rods are employed as the electrodes which were connected to a 12 volt D.C. battery through a manual switch. With the distance between the electrodes fixed and a constant depth of immersion of the electrodes, a series of the copper rods were exposed to conditions wherein anodic electrodeposition took place. The relation between dry film thickness as a function of time of passage of current is shown in Table IV. Film thickness obtained by simply dipping the rods is also shown.

TABLE VI

| TIME IN SECONDS | COATING THICKNESS IN MILS | |
|---|---|---|
| | BY ELECTRODEPOSITION | BY DIPPING |
| 5 | 0.75 | Nil |
| 10 | 1.25 | Nil |
| 20 | 1.75 | Nil |
| 30 | 2.50 | 0.25 |
| 50 | 4.0 | 0.50 |

The dried coatings obtained either at ambient temperature or by baking at elevated temperatures were coherent and glossy.

EXAMPLE 47—PROPERTIES OF DRIED COATINGS FROM IONOMER MICROEMULSION

To a varnish composed of 90 g. of Bakelite VMCC vinyl resin, 117.5 g. of MEK and 19.5 g. of butyl Cellosolve was added with vigorous stirring an aqueous solution containing 244 g. of water, 6 g. of Gelvatol-20/30, 3 g. of Cymel-301, and 2 g. of aqueous ammonium hydroxide (58%). A uniform, milky ionomer microemulsion was obtained which was concentrated under vacuum to yield a microemulsion having 39% total solids and a Brookfield viscosity of 89.6 centipoise at 25° C. This was then thinned with 77.7 phr of butyl Cellosolve to yield a microemulsion containing 30% total solids. This microemulsion was applied with a drawdown rod onto panels of 10 mil steel (type D-36 CR steel), aluminum (25 mil Q-panel) and window glass panels. The coatings were air dried to yield a 1 mil thick, clear, glossy coating on all three substrates. The following coating properties were obtained:

| COATING PROPERTY | ON Al | ON STEEL | ON GLASS |
|---|---|---|---|
| Scotch-tape adhesion, cross-hatched | PASS | PASS | PASS |
| Gardner Impact in inch/lbs. (ASTM-2794-69) | | | |
| Forward | 100[1] | 100[2] | — |
| Reverse | 80 | 100[2] | — |

[1]substrate punctured
[2]substrate severely distorted

EXAMPLE 48—PROPERTIES OF DRIED COATINGS FROM IONOMER MICROEMULSIONS

A microemulsion prepared as in Example 48 was thinned with 31 phr of butoxyethoxy-2-propanol to yield a uniform ionomer microemulsion having a total solids of 34.6%.

This thinned microemulsion was applied with a drawdown rod onto the same three substrates as in Example 47. The coatings were air dried to yield 1 mil thick, clear, glossy coatings on all three substrates. The following coating properties were obtained.

| COATING PROPERTY | ON Al | ON STEEL | ON GLASS |
|---|---|---|---|
| Cross-hatched scotch tape adhesion | PASS | PASS | PASS |
| Gardner Impact in inch/lbs. (ASTM 2794-69) | | | |
| Forward | 100[1] | 100[2] | — |
| Reverse | 80 | 100[2] | — |

[1]Substrate punctured
[2]Substrate severly distorted

The above-described microemulsion was also applied to a smooth-finished oak panel, ¼" thick, with a draw down rod. Upon drying a coherent, glossy coating was obtained.

EXAMPLE 49—PREPARATION OF AMMONIUM IONOMER MICROEMULSION

When a varnish composed of 65 g. of a terpolymer containing 80% vinyl chloride, 18% styrene and 2% acrylic acid and copolymerized therein, 117.5 g. of MEK, and 19.5 g. of butyl Cellosolve is added with vigorous stirring to an aqueous solution containing 244 g. of water, 6 g. of Gelvatol-20/30, 3 g. of Cymel-301 and 3 g. of aqueous ammonium hydroxide solution (58%), a uniform ionomer microemulsion is obtained.

EXAMPLE 50—PREPARATION OF AMMONIUM IONOMER MICROEMULSION

When a varnish composed of 65 g. of a terpolymer containing 60% vinyl chloride, 39% vinylidene chloride and 1% acrylic acid copolymerized therein, 117.5 g. of MEK and 19.5 g. of butyl Cellosolve is added with vigorous stirring to an aqueous solution containing 244 g. of water, 6 g. of Gelvatol-20/30, 3 g. of Beetle-65, and 3 g. of aqueous ammonium hydroxide solution (58%), a uniform, milky ionomer microemulsion is obtained.

EXAMPLE 51—PREPARATION OF AMMONIUM IONOMER MICROEMULSION

When a varnish composed of 65 g. of a terpolymer containing 60% vinyl chloride, 36% methyl methacrylate and 4% methacrylic acid copolymerized therein, 85 g. of MEK, and 5 g. of butyl Cellosolve is added with vigorous stirring an aqueous solution containing 244 g. of water and 5 g. of an aqueous ammonium hydroxide solution (58%). a uniform, ionomer microemulsion is obtained.

EXAMPLE 52—PREPARATION OF TRIMETHYLAMINE IONOMER MICROEMULSION

When a varnish composed of 65 g. of a terpolymer containing 80% vinyl chloride, 16% vinyl acetate and 4% 5-norbornene-2,3-dicarboxylic acid mono-n-butyl ester copolymerized therein, 65 g. of butyl Cellosolve, and 65 g. of MEK is added with vigorous stirring to an aqueous solution containing 258 g. of water and 8 g. of an aqeuous solution of trimethylamine (25%) a uniform, ionomer microemulsion is obtained.

EXAMPLE 53—PREPARATION OF TRIMETHYLAMINE IONOMER MICROEMULSION

If Example 52 is repeated with the exception that the vinyl resin is replaced with an equivalent amount of a terpolymer containing 80% vinyl chloride, 17% styrene and 3% p-styrenesulfonic acid copolymerized therein, a uniform ionomer microemulsion is obtained.

EXAMPLE 54—PREPARATION OF TRIMETHYLAMINE IONOMER MICROEMULSION

If Example 52 is repeated with the exception that the vinyl resin is replaced by an equivalent amount of a terpolymer containing 80% vinyl chloride, 18% vinyl acetate and 2% fumaric acid copolymerized therein, a uniform ionomer microemulsion is obtained.

EXAMPLE 55—STABILITY OF SODIUM IONOMER MICROEMULSIONS AT VARYING DEGREE OF NEUTRALIZATION

In order to demonstrate the effect of neutralization of the basic acid containing vinyl resin on the stability of the resultant ionomer microemulsions prepred in accordance with this invention, the technique described in the previous examples was used with a vinyl terpolymer containing 43.6% vinyl chloride, 26.9% vinyl acetate and 29.5 acrylic acid copolymerized therein. A mixture of cyclohexanone, MEK and water in a ratio of 2:3:12 by weight was employed together with sufficient of the above-described terpolymer to afford a polymer concentration of 1.17%. Neutralization was effected with varying amounts of a 0.0968N sodium hydroxide solution in water. The degree of neutralization and the stability of the resultant microemulsion in minutes is delineated in Table VII.

TABLE VII
STABILITY OF MICROEMULSION VERSUS DEGREE OF NEUTRALIZATION

| DEGREE OF NEUTRALIZATION | STABILITY IN MINUTES[a] |
|---|---|
| None | 0 |
| 9.4 | 15–25 |
| 19 | " |
| 37 | 60 |
| 47 | " |
| 59 | 60 |
| 73 | 100–200 |
| 87 | " |

TABLE VII-continued
STABILITY OF MICROEMULSION VERSUS DEGREE OF NEUTRALIZATION

| DEGREE OF NEUTRALIZATION | STABILITY IN MINUTES[a] |
|---|---|
| 100+ | >240 |

[a]Time elapsed before phase separation of the microemulsion occurred.

EXAMPLE 56—EFFECT OF SOLVENT/CO-SOLVENT RATIOS ON VINYL CHLORIDE TERPOLYMER TRIMETHYLAMINE MICROEMULSIONS

The procedure described in Example 4 was used to prepare a trimethyl ionomer microemulsion of Bakelite VMCA vinyl resin at varying ratios of butyl Cellosolve to MEK. The total formulation consisted of 12.44% resin, 29% butyl Cellosolve plus MEK, 1.24% of a 25% methanolic solution of trimethylamine and 57.32% water. The quality of the microemulsion at varying ratios of MEK to butyl Cellosolve is demonstrated in Table VIII. Using either the solvent, MEK or the co-solvent, butyl Cellosolve alone afforded unsatisfactory results.

TABLE VIII

| MEK/BUTYL CELLOSOLVE WT. RATIO | QUALITY OF MICROEMULSION |
|---|---|
| Butyl Cellosolve only | difficult to dissolve and disperse immediate resin separation |
| 0.16 | translucent, fairly uniform & stable |
| 0.20 | " |
| 0.25 | translucent, uniform & stable |
| 0.50 | " |
| 1.0 | " |
| 1.36 | " |
| 1.50 | " |
| 1.60 | " |
| 1.88 | very slightly translucent, uniform & stable |
| 2.0 | milky, uniform and stable |
| 2.3 | milky, uniform and less stable |
| 3.0 | " |
| 4.3 | " |
| MEK only | immediate resin separation |

Although the invention has been described in its preferred forms with a certain degree of particularity, it is understood that the present disclosure has been made only by way of example, and that numerous changes can be made without departing from the spirit and scope of the invention.

What is claimed is:

1. Method of preparing aqueous microemulsions of vinyl resins having carboxylic or sulfonic groups therein which comprises vigorously blending said resins with a water-miscible base, water, at least one organic water-miscible solvent which has an affinity for said resins and a boiling point below about 160° C., and an organic, water-miscible co-solvent which is a poor solvent for said resins but is miscible with the organic solvent and has a boiling point above that of the organic solvents and water.

2. Method of preparing aqueous microemulsions of vinyl resins having an average particle size of about 0.02 to about 0.14 microns which comprises blending:
(A) a normally solid vinyl resin containing carboxylic or sulfonic acid groups and having the following moieties copolymerized herein

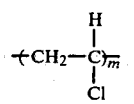 (1)

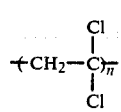 (2)

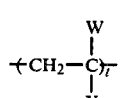 (3)

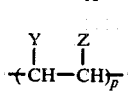 (4)

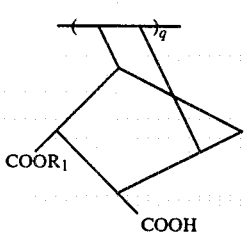 (5)

wherein m and n are percentages each having a value of 0–99%;
t is a percentage having a value of 0–59%;
p is a percentage having a value of 1–30%; when q=0;
q is a percentage having a value of 1–30%; when p=0 with the proviso that m+n+t is ≧70 and ≦99%, that m+n+t+p+q=100%, that when m=0, n is at least 1 and that when n=0, m is at least 1;
wherein X is a monovalent radical selected from the group consisting of —H and lower alkyls having 1–4 carbons;
W is a monovalent radical selected from the group consisting of —H, lower alkyls, aryl having 6 to about 9 carbons,

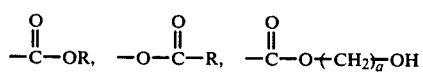

wherein a is an integer having values of 1–3,

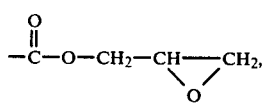

—OR wherein R is a C$_1$–C$_{18}$ alkyl,

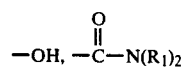

wherein R$_1$ is a monovalent radical selected from the group consisting of —H, methyl or ethyl, and —CN;
Y is a monovalent radical selected from the group consisting of —H, methyl;

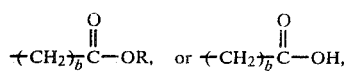

wherein b is an integer having values of 0–4; and
Z is a monovalent radical selected from the group consisting of

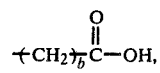

—SO$_3$H and —C$_6$H$_4$—SO$_3$H, with the proviso that Y and Z are never —COOH and —SO$_3$H at the same time, (B) sufficient water miscible base to neutralize about 10% to 100% of said carboxylic or sulfonic acid groups, (C) 1 to about 200 parts, per 100 parts by weight of vinyl resin of a water-miscible normally liquid solvent for said vinyl resin having a boiling point of up to 160° C., selected from the group consisting of lower aliphatic ketones, esters or ethers having 3 to about 6 carbon atoms and cycloaliphatic ketones or ethers having 4 to about 6 carbon atoms;

(D) 1 to about 200 parts, per 100 parts by weight of vinyl resin, of a normally liquid co-solvent which is a poor solvent for said vinyl resin and miscible with water and solvent (C), having a boiling point greater than that of solvent (C), selected from the group consisting of:

(1) glycol monoalkyl ethers having the formula:

HO—(CHR″CHR‴O)$_r$—R″″ where each of R″, R‴ is H or CH$_3$, r is an integer having values of 1 to 3 and R″″ is an alkyl group having 1 to about 4 carbon atoms, (2) aliphatic acidic ethers having the formula:

R″″O—(CH$_2$)$_s$COOH wherein R″″ is an alkyl group having 1 to 4 carbon atoms (3) amino esters having the formula:

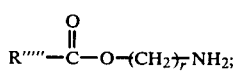

(4) amino ketones having the formula:

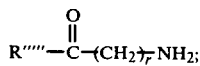

(5) aliphatic alcohols having the formula:
R$_2$OH, where R$_2$ is alkyl having 1 to 5 carbons, (6) aliphatic carboxylic acids having the formula:

where R$_3$ is H or alkyl having 1 to 4 carbons, (7) aliphatic amines having the formula:

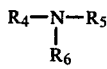

where $R_4$ and $R_5$ are H or alkyl having 1 to 6 carbons and $R_6$ is alkyl having 1 to 6 carbons with the proviso that the total number of carbons in the sum of $R_4+R_5+R_6 \leq 6$, (8) aliphatic amino ethers having the formula:

where $R_7$ is methyl or ethyl, and g has values of 1–4, (9) aliphatic dialkyl amides having the formula:

where $R_8$ is H or alkyl having 1 to 5 carbons,

(10) N-(Hydroxymethyl)acrylamide and N-hydroxymethyl(methacrylamide having the formula:

where $R_9$ is H or $-CH_3$,

(11) cycloaliphatic ether alcohols having the formula:

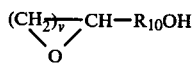

where $R_{10}$ is alkylene having 1 to 3 carbons and v is an integer having values of 1 to 5,

(12) hydroxy esters having the formula:

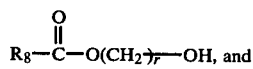

(13) hydroxy ketones having the formula:

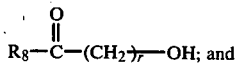

(E) sufficient water to provide an aqueous microemulsion having a total solids content of up to about 60% by weight.

3. Method claimed in claim 2 wherin the vinyl resin contains about 60 to about 91 weight % vinyl chloride, about 10 to about 25 weight % vinyl acetate and about 1 to about 15% carboxyl-containing ethylenically unsaturated hydrocarbon.

4. Method claimed in claim 3 wherein the carboxyl-containing ethylenically unsaturated hydrocarbon is maleic acid or fumaric acid.

5. Method claimed in claim 3 wherein the vinyl resin contains about 75 to about 99 weight % vinyl chloride about 1 to about 25% acrylic or methacrylic acid copolymerized therein.

6. Method claimed in claim 2 wherein a mixture of a vinyl chloride/vinyl acetate/maleic acid terpolymer and a vinyl chloride/vinyl acetate/glycidyl acrylate or methacrylate terpolymer is used.

7. Method claimed in claim 2 wherein a mixture of a vinyl chloride/vinyl acetate/maleic acid terpolymer and a vinyl chloride/vinyl acetate/hydroxyalkyl acrylate or methyacrylate having 2 to 3 carbons in the alkyl group is used.

8. Method claimed in claim 2 wherein a mixture of a vinyl chloride/vinyl acetate/maleic acid terpolymer and a vinyl chloride/vinyl acetate/vinyl alcohol terpolymer is used.

9. Method claimed in claim 2 wherein the vinyl resin is a terpolymer of vinyl chloride, vinylidene chloride and an ethylenically unsaturated carboxylic acid.

10. Method claimed in claim 9 wherein the ethylenically unsaturated carboxylic acid is maleic acid or fumaric acid.

11. Method claimed in claim 9 wherein the ethylenically unsaturated carboxylic acid is acrylic or methacrylic acid.

12. Method claimed in claim 2 wherein the vinyl resin is a copolymer of vinyl chloride and an ethylenically unsaturated carboxylic acid.

13. Method claimed in claim 2 wherein the ethylenically unsaturated carboxylic acid is acrylic or methacrylic acid.

14. Method claimed in claim 2 wherein the vinyl resin is a copolymer of vinylidene chloride and an ethylenically unsaturated carboxylic acid.

15. Method claimed in claim 2 wherein the vinyl resin (A) is first dissolved in the solvent (C) and co-solvent (D), contacted with base (B) and then emulsified with water.

16. Method claimed in claim 2 wherein the vinyl resin (A) is pulverized and added to a mixture of base (B), solvent (C), co-solvent (D) and water with vigorous agitation.

17. Method claimed in claim 2 wherein a crosslinking amount of a thermosetting resin is blended into the microemulsion.

18. Method claimed in claim 17 wherein the thermosetting resin is an epoxy resin.

19. Method claimed in claim 17 wherein the thermosetting resin is a hexamethoxymethylmelamine.

20. Method claimed in claim 17 wherein the thermosetting resin is a methylated urea-formaldehyde resin.

21. Microemulsion obtained by the method claimed in claim 2.

* * * * *

UNITED STATES PATENT AND TRADEMARK OFFICE
CERTIFICATE OF CORRECTION

PATENT NO. : 4,182,699
DATED : January 8, 1980
INVENTOR(S) : You-Ling Fan

It is certified that error appears in the above—identified patent and that said Letters Patent is hereby corrected as shown below:

At Column 2, line 26, "proviso that M + n + t is" should read -- proviso that m + n + t is --.

At Column 2, line 27, "M + n + t + p + q = 100%" should read -- m + n + t + p + q = 100% --.

At Column 2, line 28, "N is" should read -- n is --.

At Column 2, line 30, "groups consisting" should read -- group consisting --.

At Column 3, line 40, "alcohols haaving" should read -- alcohols having --.

At Column 5, lines 14-15, "commercially avaialable" should read -- commercially available --.

UNITED STATES PATENT AND TRADEMARK OFFICE
CERTIFICATE OF CORRECTION

PATENT NO. : 4,182,699          Page 2 of 4
DATED : January 8, 1980
INVENTOR(S) : You-Ling Fan It is certified that error appears in the above—identified patent and that said Letters Patent is hereby corrected as shown below:

At Column 10, line 61, "Example 4 4j" should read -- Example 4 was --.

At Column 17, line 65, "under bacuum" should read -- under vacuum --.

At Column 19, line 27, at Table IV under heading SUBSTRATE, "196°C." should be deleted.

At Column 19, lines 26-27, at Table IV under heading BAKE CYCLE, "2 min. at None" should read -- 2 min. at 196°C. --.

At Column 19, line 27, at Table IV under heading BLUSH "0%" should read -- None --.

At Column 19, line 27, at Table IV under heading CROSS HATCH ADHESIVE FAILURE, % should read -- 0% --.

At Column 20, lines 63-65, "VISCOSITY VISCOSITY CENTIPOISE" should read -- BROOKFIELD VISCOSITY CENTIPOISE --.

UNITED STATES PATENT AND TRADEMARK OFFICE
CERTIFICATE OF CORRECTION

PATENT NO. : 4,182,699  
DATED : January 8, 1980  
INVENTOR(S) : You-Ling Fan

It is certified that error appears in the above—identified patent and that said Letters Patent is hereby corrected as shown below:

At Column 21, lines 5-7, "VISCOSITY  
    VISCOSITY  
        CENTIPOISE" should read

-- BROOKFIELD  
   VISCOSITY  
   CENTIPOISE --.

At Column 21, line 53, at Table V under heading SUBSTRATE,

"195°C." should be deleted.

At Column 21, lines 52-53, at Table V under heading BAKE CYCLE,

"2 min. at None"   should read   -- 2 min. at 195°C. --.

At Column 21, line 53, at Table V under heading BLUSH, "0%"

should read -- None --.

At Column 21, line 53, at Table V under heading CROSS HATCH

ADHESIVE FAILURE, % should read -- 0% --.

At Column 23, line 23, "shown in Table IV." should read

-- shown in Table VI. --.

UNITED STATES PATENT AND TRADEMARK OFFICE
CERTIFICATE OF CORRECTION

PATENT NO. : 4,182,699

DATED : January 8, 1980

INVENTOR(S) : You-Ling Fan

It is certified that error appears in the above—identified patent and that said Letters Patent is hereby corrected as shown below:

At Column 25, line 43, "microemulsions prepred in" should read -- microemulsions prepared in --.

Claim 2 (8), Column 29, line 13, "$\{R_7O\ (CH_2)_{\overline{g}\ \overline{r}}\ NH_{3-r}$" should read -- $[R_7O\ (CH_2)_{\overline{g}\ \overline{r}}\ NH_{3-r}$ --.

Claim 2 (10), Column 29, lines 21-22, "N-hydroxymethyl(methacrylamide having" should read -- N-(hydroxymethyl)methacrylamide having --.

Claim 3, Column 29, line 53, "3. Method claimed in claim 2 wherin the" should read -- 3. Method claimed in claim 2 wherein the --.

Signed and Sealed this

Eighteenth Day of November 1980

[SEAL]

*Attest:*

SIDNEY A. DIAMOND

*Attesting Officer*   *Commissioner of Patents and Trademarks*